United States Patent [19]

Nagao et al.

[11] Patent Number: 5,372,105
[45] Date of Patent: Dec. 13, 1994

[54] COMBUSTION CHAMBER FOR TWO-CYCLE INTERNAL COMBUSTION ENGINE

[75] Inventors: Yoshiaki Nagao, Fussa; Kazuhiro Tsutsui, Hachiohji, both of Japan

[73] Assignee: Kioritz Corporation, Tokyo, Japan

[21] Appl. No.: 132,924

[22] Filed: Oct. 7, 1993

[30] Foreign Application Priority Data

Oct. 8, 1992 [JP] Japan .................. 4-070272

[51] Int. Cl.$^5$ .............................. F02B 19/16
[52] U.S. Cl. .................... 123/193.3; 123/661
[58] Field of Search ............ 123/73 R, 193.3, 193.5, 123/661

[56] References Cited

U.S. PATENT DOCUMENTS

| | | | |
|---|---|---|---|
| 3,752,129 | 8/1973 | Kobayashi et al. | 123/73 A |
| 3,844,334 | 10/1974 | Frederickson | 164/132 |
| 4,191,136 | 3/1980 | Matsumoto | 123/661 |
| 4,765,282 | 8/1988 | Nagashima | 123/41.7 |

FOREIGN PATENT DOCUMENTS

| | | |
|---|---|---|
| 47-4207 | 9/1972 | Japan . |
| 57-53026 | 3/1982 | Japan . |
| 216034 | 5/1990 | Japan . |

Primary Examiner—Noah P. Kamen
Attorney, Agent, or Firm—Cushman, Darby & Cushman

[57] ABSTRACT

A cylinder for a two-cycle internal combustion engine is disclosed which enables reduction of HC in the exhaust gas while causing no substantial deterioration in output characteristics of the engine or requiring no complicated modifications. The combustion chamber 7 is a squish dome type having a ring-shaped squish surface 7d formed in a head portion 3 of cylinder 1 in which a pair of scavenging ports 20, 20 are oppositely formed and which employ loop scavenging mode symmetrical with respect to the longitudinal section bisecting the exhaust port 16, wherein said squish surface 7d is cut out at its portion opposite to the exhaust port 16 to form a scavenging air intake 7a.

1 Claim, 4 Drawing Sheets

COMBUSTION CHAMBER FOR TWO-CYCLE INTERNAL COMBUSTION ENGINE

BACKGROUND OF THE INVENTION

1. Field of the Invention

The present invention relates to, for example, combustion chambers suitable for relatively small two cycle internal combustion engines which are used for portable machines and the like. In particular, it relates to combustion chambers for two-cycle internal combustion engines having reduced noxious substances in the exhaust gas without impairing output characteristics of the engine.

2. Description of Prior Arts

Exhaust gas is regarded as a principal cause of air pollution which is present in exhaust gas from boilers used in factories and internal combustion engines in automobiles. Various attempts have been made for reducing noxious substances contained in such exhaust gas, i.e., NOx (substances resulting from combustion of fuel), CO (substance resulting from incomplete combustion of fuel), HC (substance of unburnt combustible from fuel), and the like.

However, little attention has been directed toward relatively small (total displacement is about 35 cc or less) general purpose two-cycle gasoline engines which are used for portable machines, and the like, because of their small displacement. Recently, however, in view of increased concern with environmental problems, increased attention is being focused on small two-cycle internal combustion engines with a view to reduce noxious substances in exhaust gas discharged therefrom.

FIGS. 3 and 4 show one illustrative form of a cylinder of a conventional small air-cooled two-cycle gasoline engine, for which it is urgently needed to reduce noxious substances in exhaust gas.

Referring to FIGS. 3 and 4, the cylinder 50 comprises a cylinder portion 2 having a cylindrical inner wall 5 into which a piston is fit-inserted and a head portion 3 formed with a combustion chamber 7 of so-called squish dome type having a ring-shaped squish surface 7d integrally formed with each other, and having a plurality of cooling fins 12 at its peripheral portion. In the cylinder portion 2, an intake port 14 and an exhaust port 16 are so formed as to open oppositely at different levels, and a pair of scavenging ports 20, 20 formed on opposite sides and which employ a loop scavenging mode symmetrical with respect to the longitudinal section bisecting the exhaust port 16 (the vertical plane passing along the axis CL of the cylinder 1) [Schneule scavenging mode].

In this form, the combustion chamber 7 is formed with an ignition plug mounting opening 8 on the side opposite to the exhaust port 16 as shown in FIG.3, and a top wall surface 7b, which is slightly concave upwardly and is positioned adjacent to the top inner edge of the ignition plug mounting opening 8, and progresses to the end of the top wall surface 7b opposite to the exhaust port 16. A middle wall surface 7c is formed opposite to the ignition plug mounting opening 8, which sharply descends defining a circular arc-like curved surface in its cross-section, and a squish surface 7d extending downwardly is formed into an inclined surface having a relatively gentle gradient relative to the top end 5a of the cylinder portion 2 of the cylinder 1 and skirts the lower edge of the combustion chamber 7. Consequently, a scavenging air stream which has been ascending along an inner wall 5 opposite to the exhaust port 16 in a conventional cylinder 50 cannot effect sufficient scavenging with respect to the inner portion of the combustion chamber 7, because the stream is deflected at the squish surface 7d of an intake 7a to the combustion chamber 7. Further, the peripheral area of the top end 5a of the cylinder portion 2 is likely to be outside the scavenging air stream.

In conventional small two-cycle engine using gasoline as fuel, the presence of noxious substances contained in exhaust gas discharged therefrom such as NOx and CO can be reduced to some extent by optimizing air/fuel ratio or the like. However, no effective measures for reducing HC have been found because of insufficient scavenging performance.

SUMMARY OF THE INVENTION

In view of foregoing, it is an object of the present invention to provide a combustion chamber for a two-cycle internal combustion engine which is capable of effectively reducing HC in exhaust gas while causing no substantial deterioration in output character is tics or requiring no complicated modification.

We have made intensive and extensive studies focusing our attention on combustion chambers of small two-cycle gasoline engines, and as a result, have found that the above and other objects can be obtained by modifying the shape of a conventional combustion chamber to one which enables introducing a scavenging air (fresh gas mixture) to the combustion chamber in a positive manner.

The combustion chamber of the two-cycle engine of the present invention has been developed on the basis of the results of the studies and trial production founded thereon. Specifically, the structure is a combustion chamber 7 of a squish dome type having a ring-shaped squish surface 7d formed in a head portion 3 of cylinder 1 of a two-cycle internal combustion engine. The cylinder contains a pair of scavenging ports 20, 20 which are oppositely formed and which employ a loop scavenging mode symmetrical with respect to the longitudinal section bisecting the exhaust port 16. The combustion chamber is characterized in that the squish surface 7d is cut out at its portion opposite to the exhaust port 16 to form a scavenging air intake 7a.

The scavenging air intake of the squish surface of the combustion chamber for the two-cycle engine of the invention has an enlarged shape as compared with conventional combustion chamber, and hence introduction of fresh gas mixture into the combustion chamber is facilitated.

Consequently, burned gas (exhaust gas) in the combustion chamber is readily purged out by the fresh gas mixture, so that the amount of the exhaust gas remaining in the combustion chamber is reduced. Accordingly, enhanced scavenging efficiency can be attained. Further, since the amount of the exhaust gas remaining in the combustion chamber is reduced, ignition performance is enhanced and the possibility of misfire is lowered, thereby enabling improved output characteristics of the engine.

According to the invention, the amount of HC as unburnt combustible in exhaust gas discharged from the exhaust port is reduced remarkably, and yet, it is possible to obtain improved output characteristics even if compression ratio is lowered by enlarging the combustion chamber volume and using a lean air-fuel mixture, since scavenging efficiency and combustion performance are enhanced. Further, these advantages are attained by virtue of the modification of the shape of the combustion chamber, thereby leading to no substantial increase in cost.

DESCRIPTION OF THE PREFERRED EMBODIMENT

An embodiment of the present invention now will be described in detail with reference to the accompanying drawings.

Figure 1:
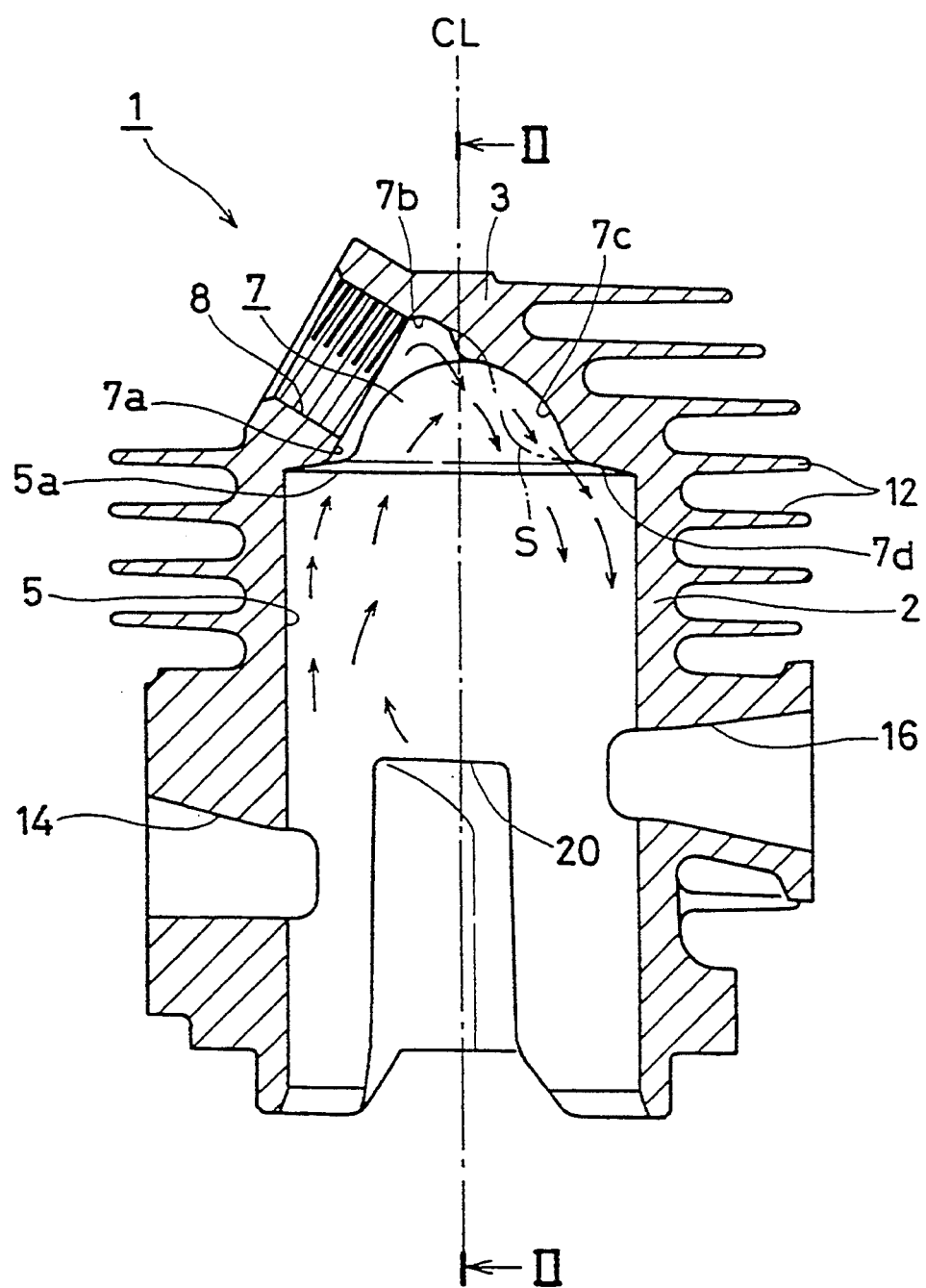
FIG. 1 is a vertical sectional view of a cylinder in which one embodiment of the combustion chamber for the two-cycle internal combustion engine according to the present invention is utilized, which is taken along the vertical plane bisecting the exhaust port.
Figure 2:
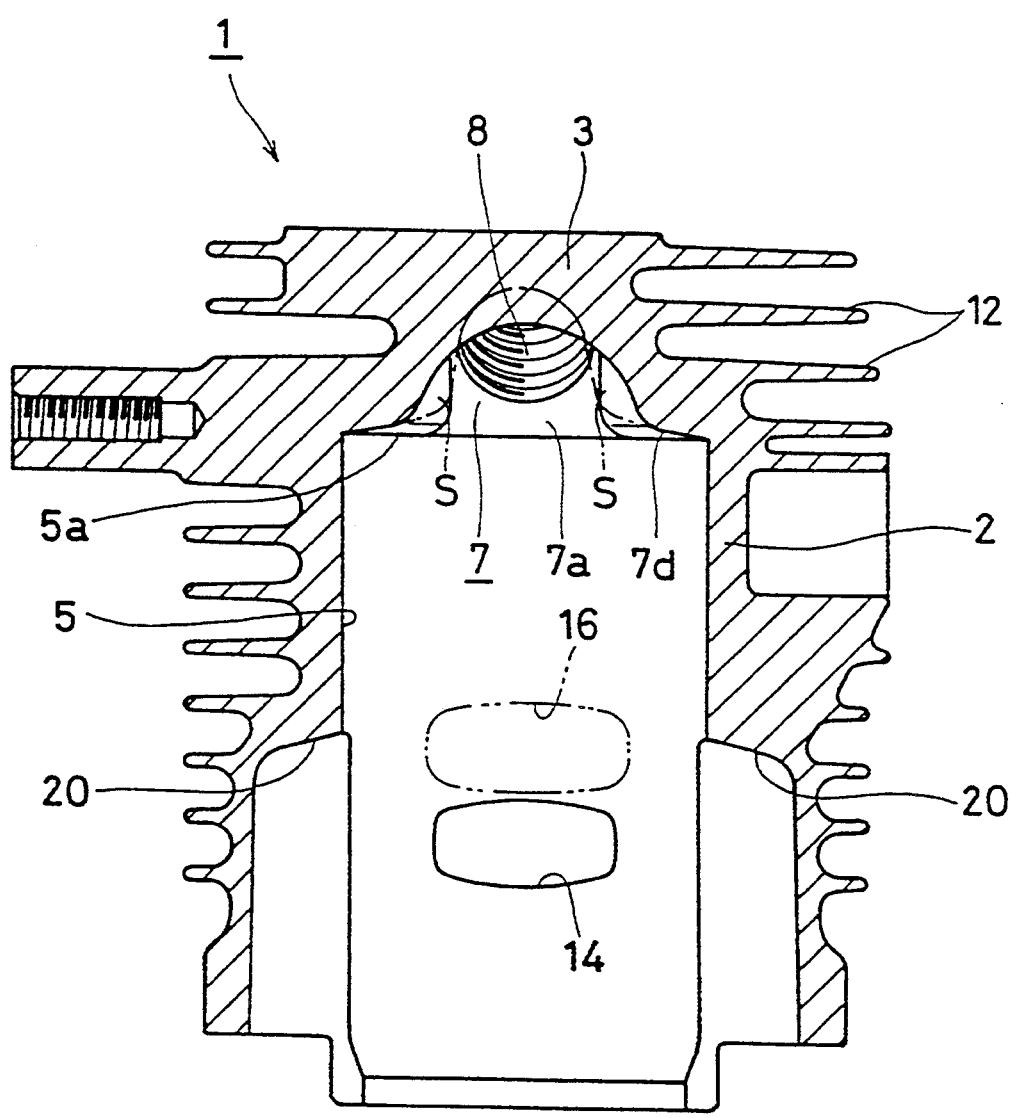
FIG. 2 is a sectional view taken along the line II—II of FIG. 1.

FIGS. 1 and 2 show one embodiment of the combustion chamber for the two-cycle internal combustion engine of the present invention. In these FIGS., the same reference numbers are used to identify the parts as used for the corresponding parts of the above-described conventional cylinder 50 shown in FIGS. 3 and 4 to eliminate overlapping explanation. The differences between the invention engine and the prior art engine will be described hereinbelow.

Referring to combustion chamber 7 of cylinder 1 of the embodiment shown in FIG. 1, an ignition plug mounting opening 8 is formed on a side opposite to the exhaust port 16, and the ring-shaped squish surface 7d is formed into an inclined surface having a relatively gentle gradient relative to the top end 5a of the cylinder portion 2 of the cylinder 1. The combustion chamber 7 is shaped into a hemisphere dome with a spreading skirt, and the squish surface 7d is cut out at its portion opposite to the exhaust port 16 to form a scavenging air intake 7a.

Referring to combustion chamber 7 of this embodiment, the portion shown by the reference S (broken line) is removed from the conventional combustion chamber 7 of the cylinder 50 as shown in FIGS. 1 and 2 by the imaginary line, and a portion of the ring-shaped squish surface 7d is cut out to form the scavenging air intake 7a. Consequently, the shape of the combustion chamber 7 enables the fresh gas mixture to be readily introduced into the combustion chamber 7 and the exhaust gas removed.

Figure 3:
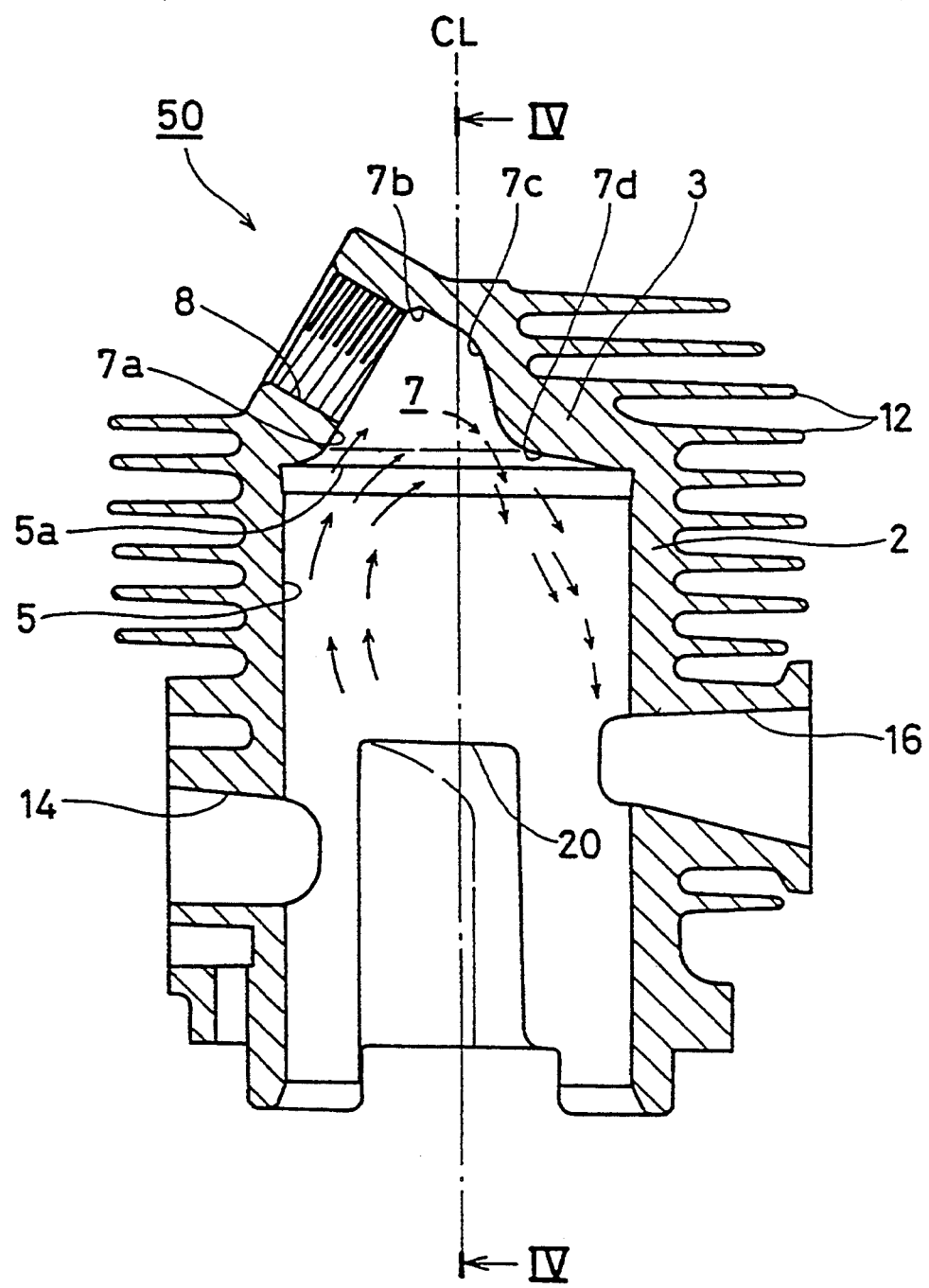
FIG. 3 is a vertical sectional view of a cylinder in which one form of a conventional combustion chamber for a two-cycle internal combustion engine.
Figure 4:
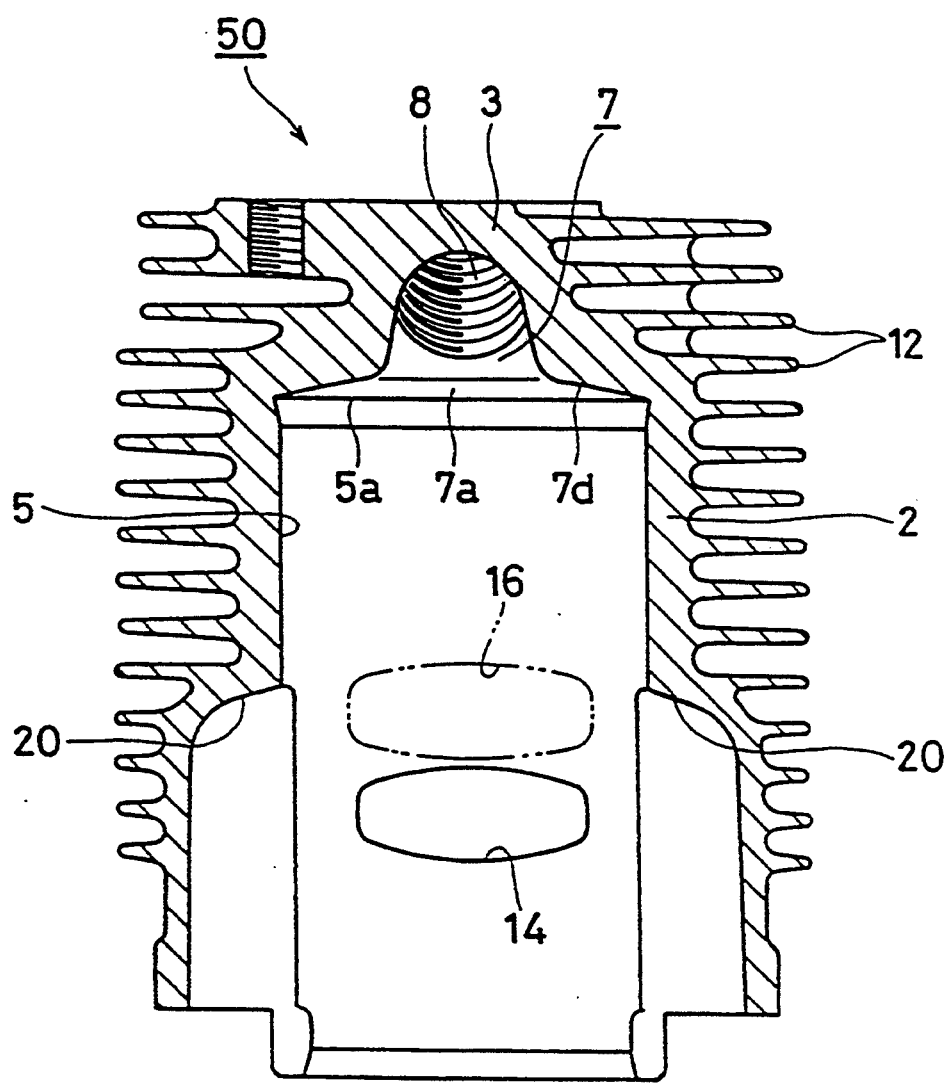
FIG. 4 is a sectional view taken along the line IV—IV of FIG. 3.

In the conventional cylinder 50, the fresh gas mixture blown off from the scavenging ports 20, 20 does not flow into the combustion chamber 7 readily, as shown by arrows in FIG. 3, whereas in the cylinder 1 of the present invention, the fresh gas mixture flows smoothly even to the innermost portion (the top wall surface 7b) of the combustion chamber 7.

Consequently, burned gas (exhaust gas) in the combustion chamber 7 is readily purged out by the fresh gas mixture, so that the amount of exhaust gas remaining in the combustion chamber 7 is reduced. Accordingly, enhanced scavenging efficiency can be obtained. Further, since the amount of the exhaust gas remaining in the combustion chamber 7 is reduced, ignition performance is enhanced and the possibility of misfire is lowered, thereby enabling improved engine output characteristics to be attained.

According to invention, even if compression ratio is lowered by enlarging the volume of the combustion chamber, the amount of HC as unburnt combustible in the exhaust gas discharged from the exhaust port is reduced remarkably, and yet, it is possible to attain rather improved output characteristics since scavenging efficiency and combustion performance are enhanced as described above. Further, these advantages are attained by virtue of a modification of the shape of the combustion chamber, thereby minimizing increase in cost.

We produced a cylinder 1 (total displacement: 25 cc) by way of trial with a combustion chamber 7 having a configuration as mentioned above and, after experimental operation was carried out, it was confirmed that, by virtue of such modification of the configuration of the combustion chamber, the total amount of HC was reduced remarkably (by 15% or more) as compared with the conventional cylinder 50. However, substantially the same output for the invention engine as obtained by the conventional cylinder 50 was obtained even though the compression ratio was reduced and the volume of the combustion chamber was enlarged by as much as 20%.

In addition, the operating force of the recoil starter can be lowered advantageously because of the reduced compression ratio, and yet, there is attained subsidiary effect that the enhanced combustion performance enables tar content contained in the exhaust gas to be reduced.

It is further preferred that an ignition plug be disposed on the axis of the cylinder and that the ignition point be positioned at the center of the combustion chamber.

As can be understood from the above description of the combustion chamber for the two-cycle internal combustion engine of the present invention, the reduction of HC in the exhaust gas can be effectively attained while causing substantially no deterioration in output characteristics or requiring no complicated modifications.

What is claimed is:

1. A combustion chamber for a Schneule scavenging mode two-cycle internal combustion engine having a combustion chamber 7 of a squish dome type having a ring-shaped squish surface 7d formed in a head portion 3 of a cylinder 1 of said two-cycle internal combustion engine in which a pair of scavenging ports 20, 20 are oppositely formed on a cylindrical inner wall of said cylinder 1 which employ loop scavenging mode symmetrical with respect to the longitudinal section bisecting an exhaust port 16 formed on said cylindrical inner wall 5, and an ignition plug mounting opening 8 on the side opposite to said exhaust port 16, wherein said squish surface 7d is cut out as wide as at least the width of said ignition plug mounting opening 8 at its portion opposite to said exhaust port 16 to form a scavenging intake 7a near by said cylindrical inner wall 5 to readily introduce fresh gas mixture into said combustion chamber 7.

* * * * *